US011138383B2

(12) United States Patent
Sheinin

(10) Patent No.: US 11,138,383 B2
(45) Date of Patent: Oct. 5, 2021

(54) EXTRACTING MEANING REPRESENTATION FROM TEXT

(71) Applicant: International Business Machines Corporation, Armonk, NY (US)

(72) Inventor: Vadim Sheinin, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 119 days.

(21) Appl. No.: 16/546,728

(22) Filed: Aug. 21, 2019

(65) Prior Publication Data
US 2021/0056173 A1 Feb. 25, 2021

(51) Int. Cl.
*G06F 40/30* (2020.01)
*G06N 3/04* (2006.01)
(Continued)

(52) U.S. Cl.
CPC ............ *G06F 40/30* (2020.01); *G06F 40/211* (2020.01); *G06N 3/0445* (2013.01); *G06N 3/08* (2013.01)

(58) Field of Classification Search
CPC ..... G06F 40/30; G06F 40/211; G06N 3/0445; G06N 3/08
See application file for complete search history.

(56) References Cited

U.S. PATENT DOCUMENTS

| 8,645,122 B1* | 2/2014 | Di Fabbrizio | .......... G06F 40/20 704/9 |
| 2003/0123737 A1* | 7/2003 | Mojsilovic | ............. G06K 9/726 382/224 |

(Continued)

FOREIGN PATENT DOCUMENTS

| CN | 104021115 | 9/2014 |
| CN | 104156352 | 11/2014 |

(Continued)

OTHER PUBLICATIONS

Kwiatkowski, E. et al.,"Scaling Semantic Parsers with On-The-Fly Ontology Matching," Proceedings of the 2013 Conference on Empirical Methods in Natural Language Processing, pp. 1545-1556 (Oct. 18-21, 2013).

(Continued)

*Primary Examiner* — Kevin Ky
(74) *Attorney, Agent, or Firm* — Ryan, Mason & Lewis, LLP

(57) ABSTRACT

Methods, systems, and computer program products for extracting meaning representation from text are provided herein. A computer-implemented method includes performing a syntactic analysis on a fragment of text to derive a syntactic structure; selecting one or more predefined syntactic structure templates corresponding to the derived syntactic structure that define different combinations of semantic primes and semantic features corresponding to the semantic primes; detecting semantic information in the fragment of text, wherein the semantic information comprises at least one of the semantic primes and one or more of the corresponding semantic features; identifying one of the selected predefined syntactic structure templates that matches the derived syntactic structure and the detected semantic information in the fragment of text; generating a computable meaning representation of the fragment of text based at least in part on the identifying; and outputting the computable meaning representation to a natural language understanding application.

20 Claims, 7 Drawing Sheets

(51) Int. Cl.
*G06N 3/08* (2006.01)
*G06F 40/211* (2020.01)

(56) References Cited

U.S. PATENT DOCUMENTS

| | | | |
|---|---|---|---|
| 2003/0195883 A1* | 10/2003 | Mojsilovic | G16H 30/40 |
| 2009/0070113 A1* | 3/2009 | Gupta | G10L 15/22 |
| | | | 704/257 |
| 2014/0328570 A1* | 11/2014 | Cheng | H04N 21/44008 |
| | | | 386/241 |
| 2014/0369596 A1* | 12/2014 | Siskind | G06F 16/784 |
| | | | 382/158 |
| 2014/0380286 A1* | 12/2014 | Gabel | G06N 5/022 |
| | | | 717/139 |
| 2015/0100943 A1* | 4/2015 | Gabel | G06F 8/30 |
| | | | 717/106 |
| 2016/0275058 A1 | 9/2016 | Starostin et al. | |
| 2017/0031900 A1 | 2/2017 | Anisimovich | |
| 2017/0371861 A1 | 12/2017 | Barborak et al. | |

FOREIGN PATENT DOCUMENTS

| | | |
|---|---|---|
| CN | 109408814 A | 3/2019 |
| CN | 109478205 A | 3/2019 |
| JP | 2003281138 | 10/2003 |
| RU | 2681356 C1 | 3/2019 |

OTHER PUBLICATIONS

Wierzbicka, A., The Semantics of Grammar, vol. 18. John Benjamins Publishing, pp. 386-387, 1988.

\* cited by examiner

EXTRACTING MEANING REPRESENTATION FROM TEXT

BACKGROUND

The present application generally relates to information technology and, more particularly, to natural language understanding in artificial intelligence.

Natural language understanding (NLU) relates to, for example, machine reading comprehension, and is generally considered one of the more difficult problems in artificial intelligence. There is considerable interest in NLU due to its many applications which include, for example, automated reasoning, machine translation, and voice activation. Existing techniques in computer science are generally limited to natural language processing (NLP) and information extraction (IE) systems. These systems fail to provide true NLU capabilities. Additionally, there is still no agreement in theoretical linguistics and semantics on the definition of the word 'meaning', and none of the several approaches to the word 'meaning' in theoretical semantics is practical for building a computer-based system for NLU.

SUMMARY

In one embodiment of the subject matter described herein, techniques for extracting meaning representation from text are provided. An exemplary method includes the steps of performing a syntactic analysis on at least one fragment of text to derive a syntactic structure of the fragment of text; selecting one or more predefined syntactic structure templates corresponding to the derived syntactic structure, wherein each of the predefined syntactic structure templates define different combinations of semantic primes and semantic features corresponding to the semantic primes for the derived syntactic structure; detecting semantic information in the fragment of text, wherein the semantic information comprises (i) at least one of the semantic primes and (ii) one or more of the corresponding semantic features; identifying one of the selected predefined syntactic structure templates that matches the derived syntactic structure and the detected semantic information in the fragment of text; generating a computable meaning representation of the fragment of text based at least in part on the identifying; and outputting the computable meaning representation to one or more natural language understanding applications.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
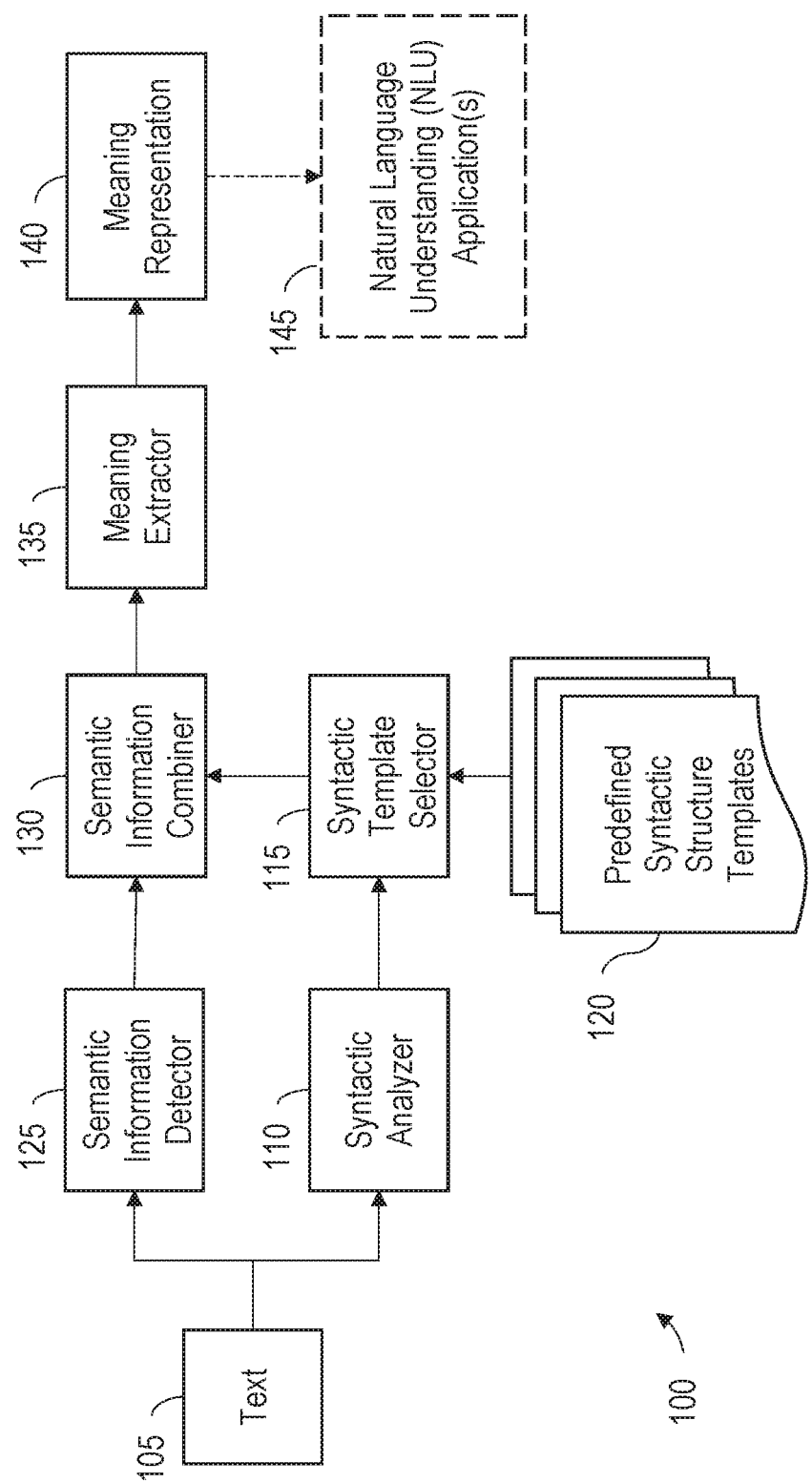
FIG. 1 is a diagram illustrating a system architecture according to an exemplary embodiment of the invention.

As noted above, existing techniques fail to provide computer-based systems that offer true NLU capabilities. A system that converts a text to its meaning representation is called semantic parser. Generally, there are two cases in semantic parsing, namely, open domain and closed domain. In a closed domain case, it is assumed that the input text comes from only a given domain and that there is some representation of the domain. For example, an ontology is frequently used as a domain knowledge representation. Ontologies generally include concepts and relations that are active in the domain. For example, if the domain is buying plane tickets, then the ontology includes concepts such as ticket, flight, destination, city, state, country, price, non-stop etc. Examples of relations in this domain include tickets bought, prices paid for tickets, departure city of flights, etc.

There are several approaches to detect what concepts and relations are present in an input text given an ontology. One approach is a rule-based system that has a traditional NLP pipeline comprised of a dependency parser and a rule-matching engine. These systems apply preconfigured rules to a dependency tree generated from every input sentence to search for matches that indicate what concepts and relations from the ontology were detected. Concepts and relations that are detected are treated as a meaning representation. This meaning representation can be further used in a particular NLU task such as a Natural Language Interface to Databases through its conversion into a corresponding SQL query.

There are several drawbacks to this approach. First, the ontology generally needs to be known ahead of time which is problematic for a broad domain of knowledge. Second, dependency parsing tends to make mistakes causing the systems to be relatively inaccurate (around 60-70%). Additionally, the rules are created ahead of time which is not only time consuming, but also prone to error.

Another approach to semantic parsing is based on Deep Learning (DL) technology, where a parser is trained on a large corpus of labeled sentences and their meaning representation using logical forms. This type of approach has the disadvantage of requiring a large corpus of annotated data. Additionally, only very simple meaning constructs are possible within this this corpus. Accordingly, these systems also tend to be inaccurate, particularly when the system is trained in one domain and then presented with questions from another, different domain. This is the case as the system learned to map from text to structured representations within a set of examples that were provided in the training corpus.

Human languages are very complex, and these approaches are often not suitable for either complex cases or when the system is presented from a different domains.

The exemplary embodiments herein describe techniques for representing a meaning of text in a computable way. Generally, these techniques represent meaning as a combination of universal meaning primitives and their features. The meaning can be extracted, for example, by applying semantic primes and Natural Semantic Metalanguage (NSM) theory to extract meaning representation in a computable way.

NSM works for 70+ languages and also handles multiple linguistic concepts. NSM postulates that meaning can be represented by a very small number (i.e., sixty-four) of semantic primes. Semantic primes are concepts that are universal inasmuch as they can be translated into any known language and retain their semantic representation. Semantic primes are also primitive as they correspond to the simplest linguistic concepts and cannot be defined using simpler terms. NSM also provides rules on how these semantic primes interact with each other. A semantic analysis in NSM results in a reductive paraphrase called an 'explication', which captures the meaning of the concept explicated. The following is one example of an NSM explication:

Someone X is happy (at this time):
someone X thinks like this at this time:
  "many good things are happening to me as I want
  I can do many things now as I want
  this is good"
because of this, this someone feels something good at this time
  like someone can feel when they think like this Turning now to FIG. 1, this figure is a diagram illustrating a system architecture 100 according to an exemplary embodiment. The architecture 100 includes syntactic structure analyzer 110, syntactic template selector 115, a semantic information detector 125, a semantic information combiner 130, and a meaning extractor 135.

The syntactic analyzer 110 obtains one or more fragments of text 105 and analyzes the fragments to derive syntactic structures. This may be done, for example, by using a constituents or a dependency parser. The syntactic template selector 115 selects one or more syntactic structure templates 120 that correspond to the derived syntactic structures. It is noted that each of the syntactic structure templates 120 define how to combine semantic primes and their features. The syntactic structure templates 120 may be determined in advance via an offline process (e.g., based on a manual linguistic analysis).

The semantic information detector 125 detects semantic primes and their features in the fragments of text 105. The detection may be performed using a DL model that is trained on a large corpus (e.g., on the order of 100,000 sentences) per semantic prime. In this way, universal building blocks are detected irrespective of the domain being used, and these building blocks can be easily consumed by any application. As such, the semantic information detector 125 needs to be trained only once and needs not be retrained for specific domains and/or specific application.

Figure 2:
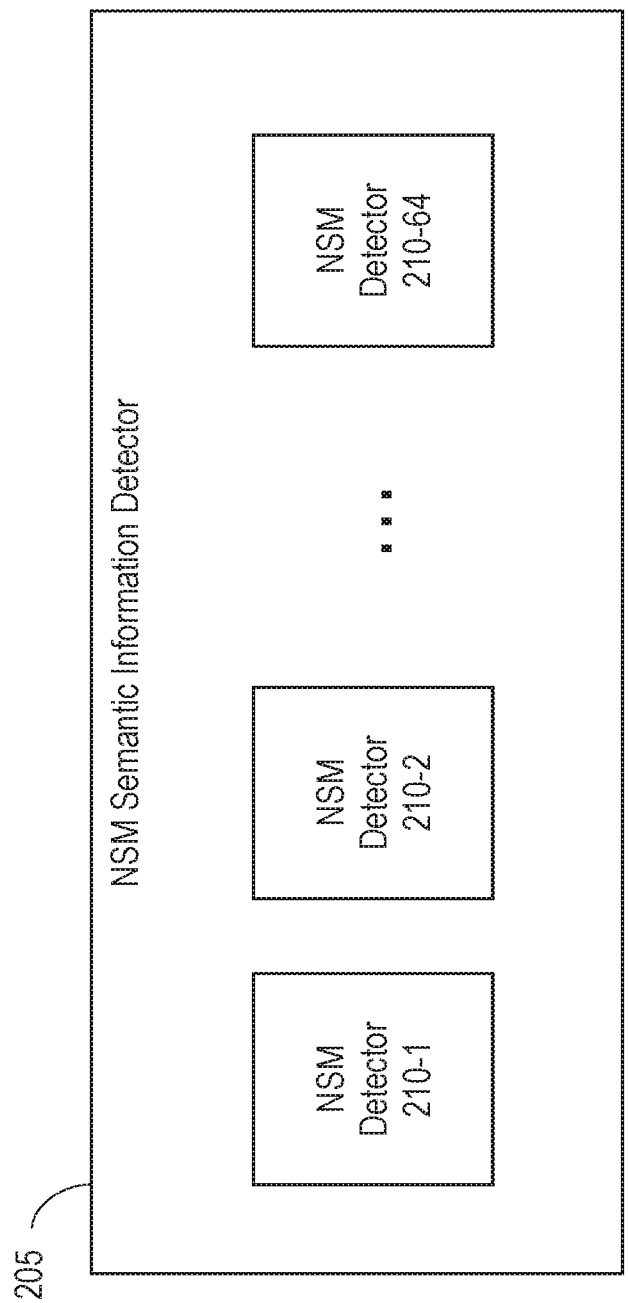
FIG. 2 is a diagram illustrating a semantic information detector in accordance with exemplary embodiments.

Referring also to FIG. 2, this figure depicts an NSM semantic information detector 205 in accordance with at least one example embodiment. The NSM semantic information detector 205 may correspond to, for example, the semantic information detector 125 in FIG. 1. The NSM semantic information detector 205 includes a number of NSM detectors 210-1 . . . 210-64 (collectively referred to as NSM detectors 210), wherein each of the NSM detectors is configured to detect one of the sixty-four semantic primes and its features. Each of the NSM detectors 210 can be based on a DL approach, such as a Bidirectional-Long Short Term Memory (Bi-LSTM) with attention model, for example.

The semantic information combiner 130 combines the detected semantic primes and their features using the syntactic structure templates that were selected by the syntactic template selector 115. The meaning extractor 135 determines which of the selected syntactic structure templates guarantees a match between the syntactic structure of the text fragments and the semantic information output by the semantic information detector 125, and outputs a meaning representation 140 of the fragments of text based on the match. The meaning representation may then be consumed by one or more NLU applications 145.

Accordingly, a sequence of processing steps may include the following:
1. Parsing input text (such as by a constituents parser or a dependency parser, for example).
2. Syntactic templates, that are prepared ahead of time, are applied to the parsed text to find a match. In at least one example, a syntactic template is equivalent to a subtree of a dependency tree (such as, for example, subject-verb-object, noun-preposition-noun, etc.). Each template has a plethora of meanings associated with it, wherein each meaning depends on the semantic characteristics of the words that triggered a given syntactic pattern.
3. The input text is passed through semantic detectors that determine semantic characteristics of the input text and its words based on NSM theory as a non-limiting example.
4. Given the semantic characteristics determined from step 3, it can be determined which of the potential meanings of a given syntactic construct is actually present in the input text.

Figure 3:
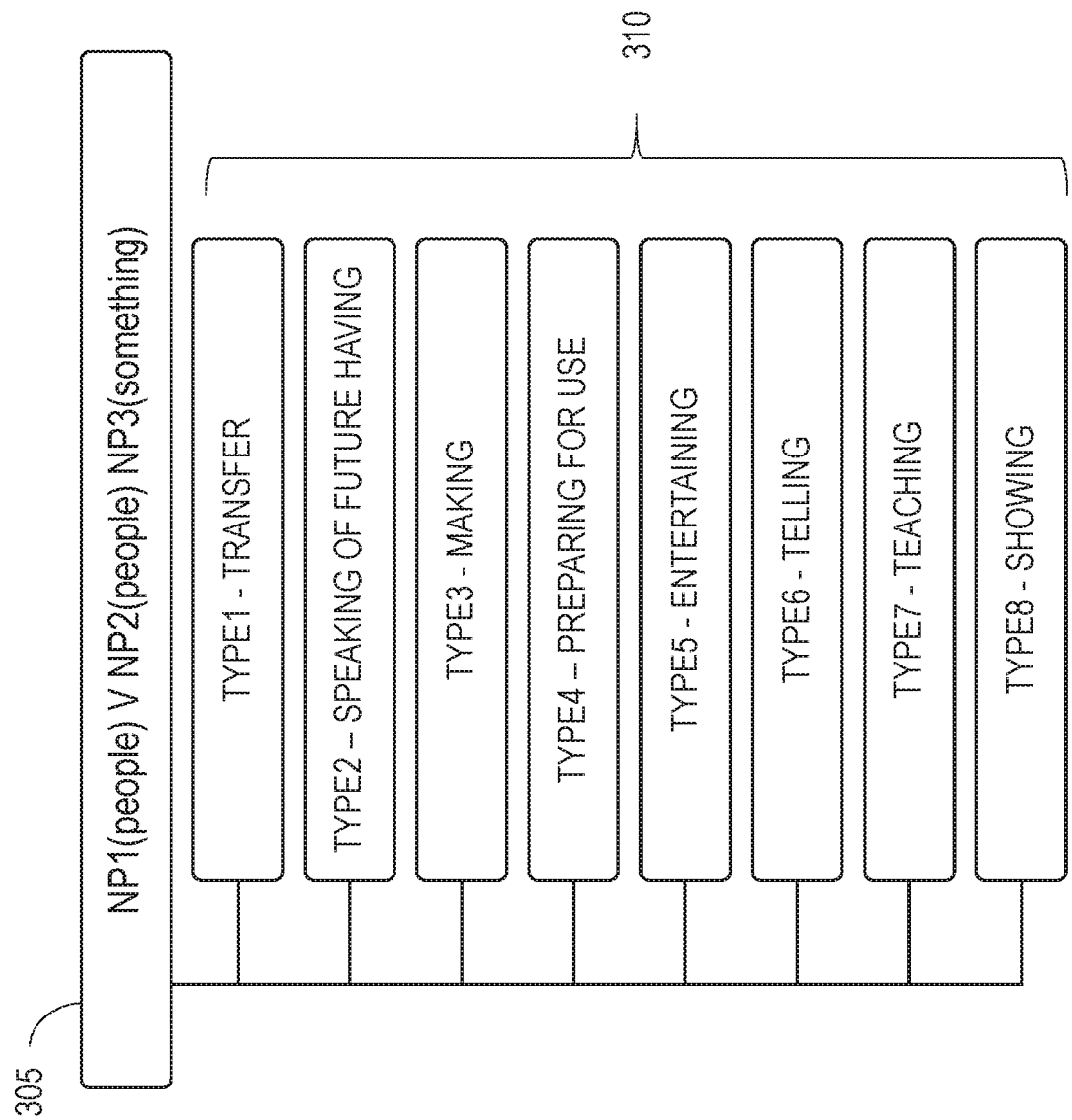
FIG. 3 is a diagram illustrating a syntactic structure with associated potential meanings in accordance with exemplary embodiments.

Referring now to FIG. 3, this figure depicts a syntactic structure 305 in accordance with exemplary embodiments. In this example, the syntactic structure 305 is "NP1(people) V NP2(people) NP3(something)" where NP denotes a noun phrase, and V denotes a verb. The syntactic structure 305 corresponds to the internal dative in the English language (see, e.g., Wierzbicka, A., *The Semantics of Grammar, Vol. 18*. John Benjamins Publishing, 1988). The syntactic structure 305 includes eight corresponding types 310. Each of the types 310 is distinct and provides a template on how to combine semantic primes and their features for the given syntactic structure 305. For example, Type 1—Transfer provides the following template:

NP1 did something to NP3
Wanting NP2 to have NP3
Something happened to NP3 because of that
One could think this at that time:
  NP2 will come to have NP3 because of that As one can see, in Type 1—Transfer, NP3 will mostly denote a physical concrete object, and the verb will very often indicate that the object denoted by NP3 is in motion (semantic prime); whereas in Type 6—Telling, NP3 will generally denote words since this type relates to an information exchange.

Each of the eight types shown in FIG. 3 can be distinguished from each of the other types once all semantic prime detectors have been applied to the input text. After the application of semantic prime detectors, meaning extractor 135 determines the meaning (namely, which one of the types) of the input text.

As another example, Type 6—Telling provides the following template:
NP1 said something to NP2
Wanting NP2 to come to know NP3 because of that
Something happened to NP3 because of that
One could think this at that time:
   NP2 will come to <u>know</u> NP3 because of that Templates corresponding to other types 310 would be apparent to a person skilled in the art based on the description above.

In order to determine the meaning of an input sentence having a particular syntactic construct, all semantic information of the sentence is composed according to the corresponding templates. The meaning of the input sentence is then equal to the template that produced a match between a form (i.e., syntax) and content (i.e., semantics). For example, the syntactic structure of the input sentence "Jim threw Betty an apple" corresponds to the syntactic structure 305 in FIG. 3 (i.e., internal dative in English language). The semantic information of the sentence is then combined according to the different templates of types 310 to find a match. For this example, the input sentence "Jim threw Betty an apple" matches Type 1—Transfer. As another example, the input sentence "Bill emailed Sue the news" is matched to Type 6—Telling.

According to an example embodiment, semantic primes and their corresponding features may be detected for a fragment of text such that each one of the features has a separate representation. Accordingly, the semantic information of a given input text may include data representing one or more of the sixty-four semantic primes, as well as data representing each of the features corresponding to those semantic primes. For example, if the semantic prime MOTION is detected in an input sentence, then the semantic information may include a data representation of MOTION, as well as data representations of the features corresponding to the semantic prime MOTION. The features corresponding to the semantic prime MOTION may include, for example, what objects in the input sentence are in motion and any additional information about the features of the motion itself whether an object moves by itself (e.g., producing force for motion) or through an application of force from another object, whether or not a starting point of motion is indicated, etc. By way of example, if the input is "Jack jumped from the cliff", then the data representation that are output can indicate: (i) motion is present, (ii) Jack is the moving object, (iii) motion is mostly vertical, (iv) the starting point for the motion is a cliff, etc. The data representations may include, for example, one or more graphs showing the semantic primes, the features of the semantic primes, and the relationships there between.

Figure 4:
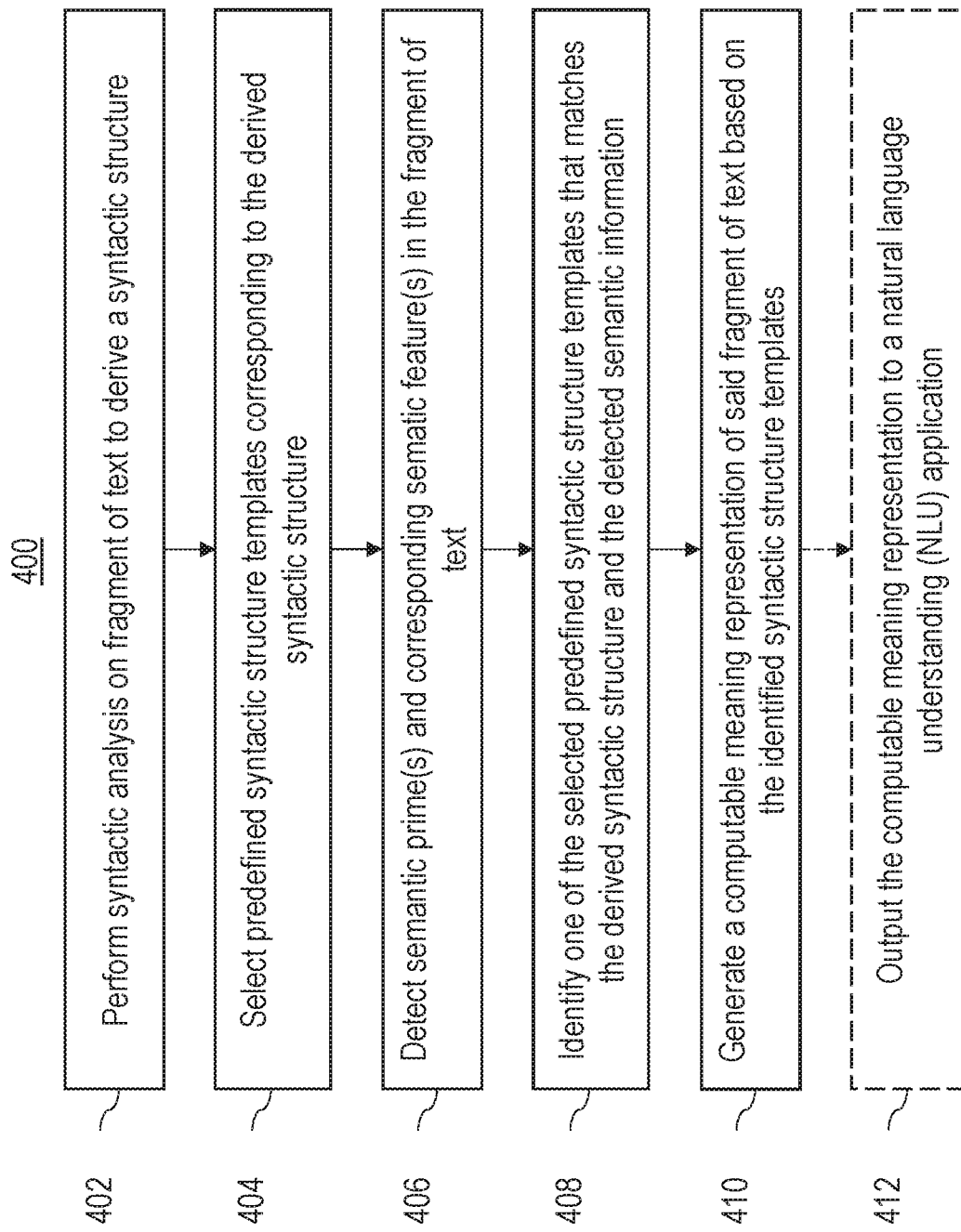
FIG. 4 is a flow diagram illustrating techniques according to an embodiment of the invention.

FIG. 4 is a flow diagram of a process 400 according to an exemplary embodiment of the subject matter described herein. Step 402 includes performing a syntactic analysis on at least one fragment of text to derive a syntactic structure of the fragment of text. Step 404 includes selecting one or more predefined syntactic structure templates corresponding to the derived syntactic structure, wherein each of the predefined syntactic structure templates define different combinations of semantic primes and semantic features corresponding to the semantic primes for the derived syntactic structure. Step 406 includes detecting semantic information in the fragment of text, wherein the semantic information comprises (i) at least one of the semantic primes and (ii) one or more of the corresponding semantic features. Step 408 includes identifying one of the selected predefined syntactic structure templates that matches the derived syntactic structure and the detected semantic information in the fragment of text. Step 410 includes generating a computable meaning representation of the fragment of text based at least in part on the identifying. Step 412 includes outputting the computable meaning representation to one or more natural language understanding applications, The syntactic analysis may be performed by a constituents or dependency parser. The one or more predefined syntactic structure templates may be selected from a plurality of predefined syntactic structure templates that are defined by an offline linguistic analysis. The detecting in step 406 may include providing the fragment of text as input to at least one trained neural network, wherein the at least one trained neural network outputs the semantic information. The at least one trained neural network may include a Bidirectional-Long Short Term Memory (B-LSTM) with attention model. The at least one trained neural network may be trained to detect each of a plurality of semantic primes across a plurality of domains. The at least one semantic prime may be detected from a set of sixty-four semantic primes. The process 400 may include obtaining the at least one fragment of text from one or more of: a text file, an audio file, an image file, and a video file.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 5:
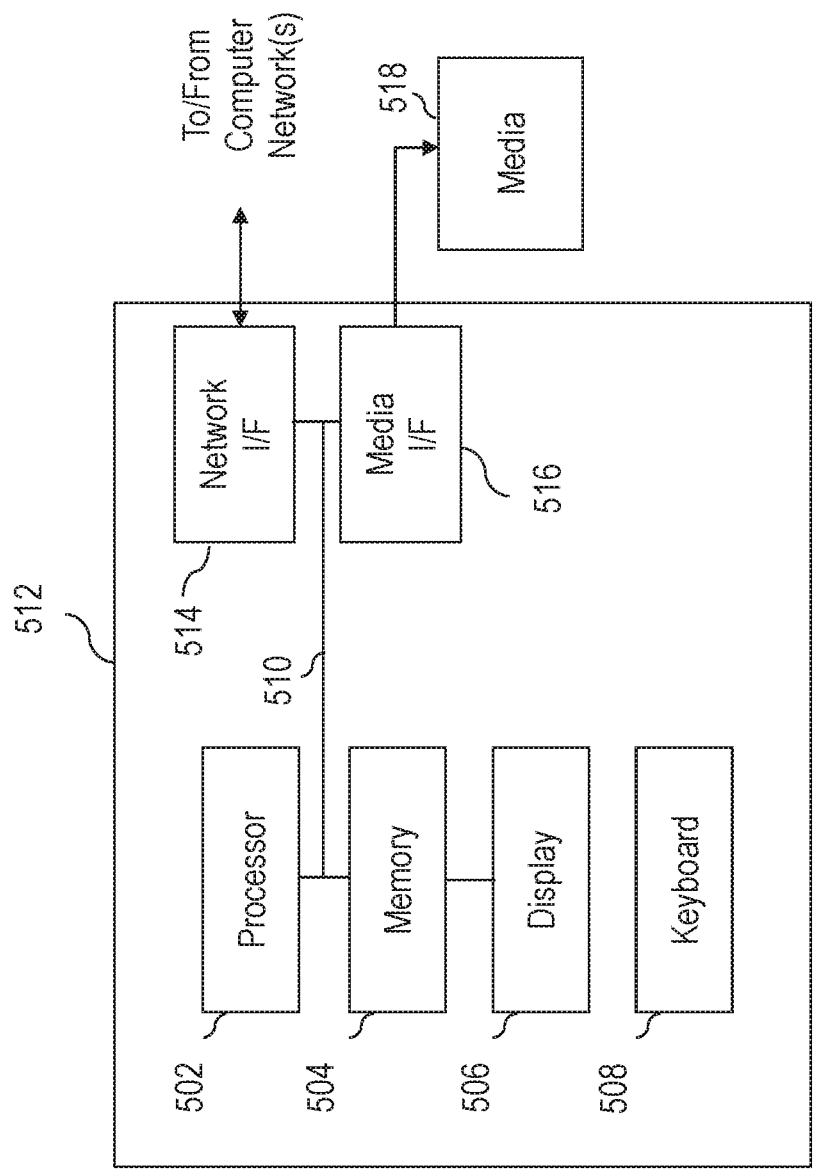
FIG. 5 is a system diagram of an exemplary computer system on which at least one embodiment of the invention can be implemented.

Additionally, an embodiment of the present invention can make use of software running on a computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
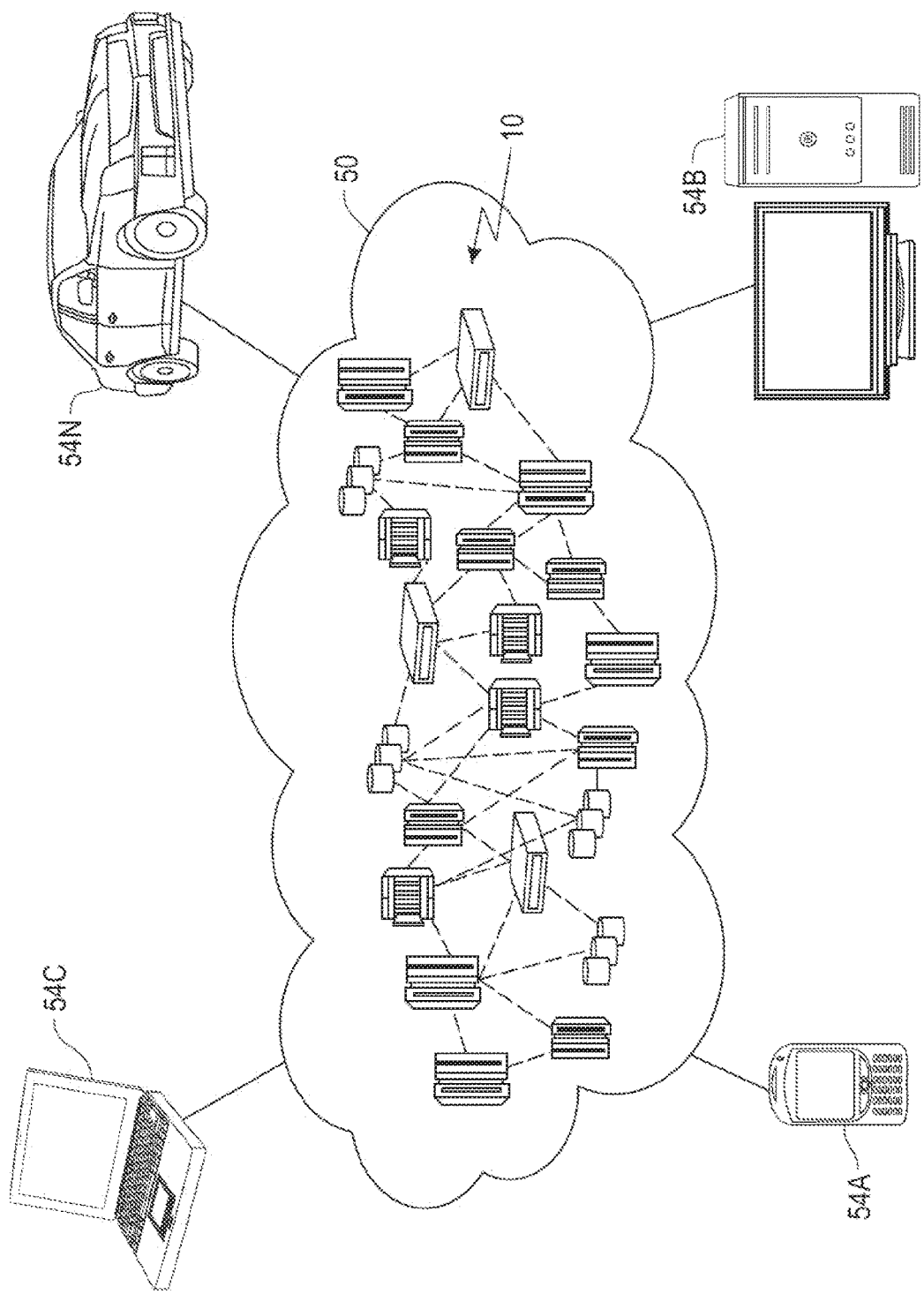
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
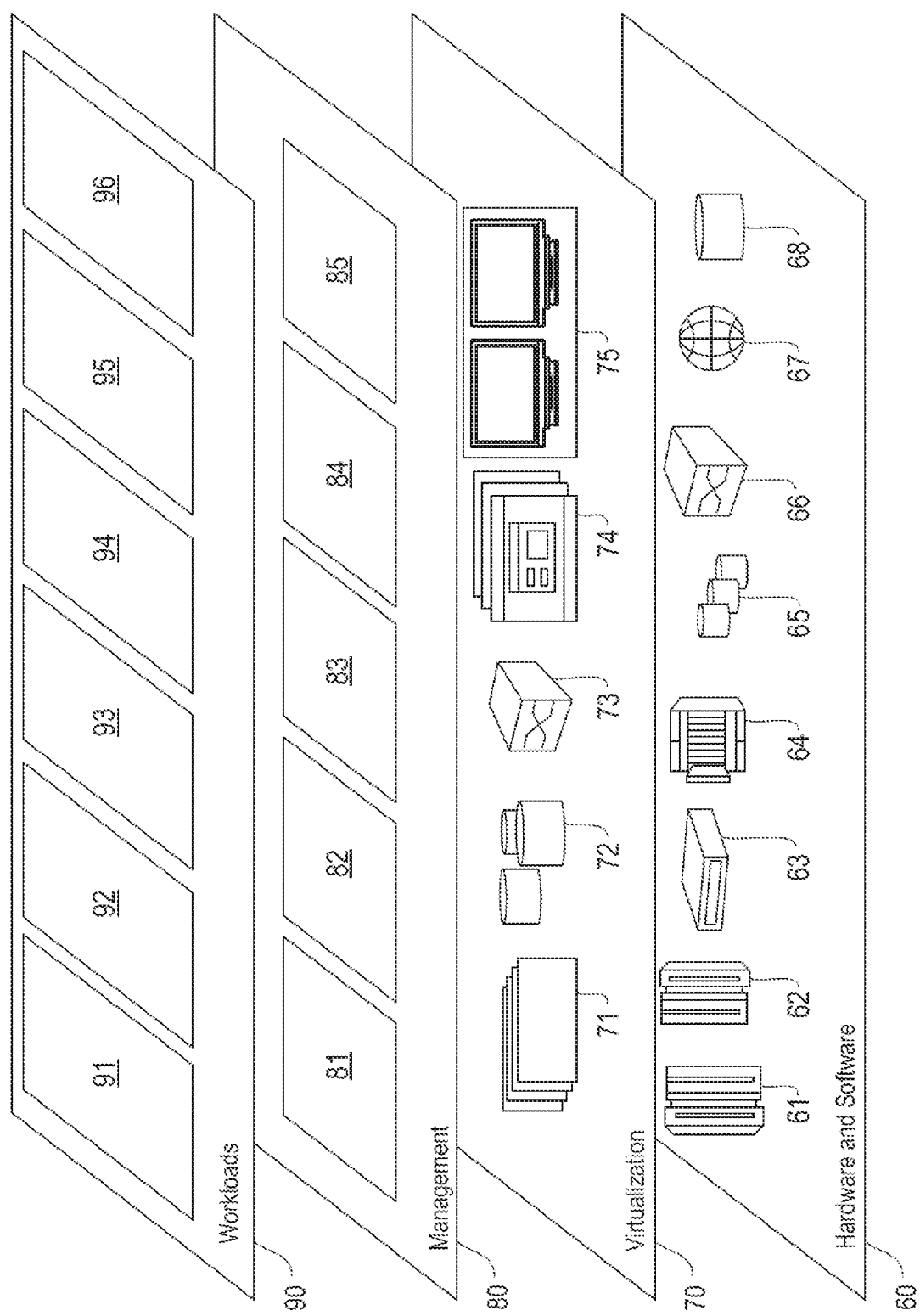
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and extraction of meaning representation 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

Without in any way limiting the scope, interpretation, or application of the claims appearing below, a technical effect of one or more of the example embodiments disclosed herein is representing a meaning representation of a fragment text across domains in a computable way that can be used by different NLU applications. Another technical effect of one or more of the example embodiments disclosed herein is avoiding the need to retrain semantic detector for different domains and for different application.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
    performing a syntactic analysis on at least one fragment of text to derive a syntactic structure of said fragment of text;
    selecting one or more predefined syntactic structure templates corresponding to said derived syntactic structure, wherein each of the predefined syntactic structure templates define different combinations of semantic primes and semantic features corresponding to said semantic primes for said derived syntactic structure;
    detecting semantic information in said fragment of text, wherein the semantic information comprises (i) at least one of the semantic primes and (ii) one or more of the corresponding semantic features, wherein said detecting comprises providing said fragment of text as input to at least one trained neural network comprising an attention layer;
    identifying one of the selected predefined syntactic structure templates that matches the derived syntactic structure and the detected semantic information in said fragment of text;
    generating a computable meaning representation of said fragment of text based at least in part on said identifying; and
    outputting said computable meaning representation to one or more natural language understanding applications;
    wherein the method is carried out by at least one computing device.

2. The computer-implemented method of claim 1, wherein said syntactic analysis is performed by at least one of: a constituents and a dependency parser.

3. The computer-implemented method of claim 1, wherein the one or more predefined syntactic structure templates are selected from a plurality of predefined syntactic structure templates that are defined by an offline linguistic analysis.

4. The computer-implemented method of claim 1, wherein the at least one trained neural network outputs said semantic information.

5. The computer-implemented method of claim 4, wherein the at least one trained neural network comprises a Bidirectional-Long Short Term Memory (B-LSTM) with attention model.

6. The computer-implemented method of claim 4, wherein the at least one trained neural network is trained to detect each of a plurality of semantic primes across a plurality of domains.

7. The computer-implemented method of claim 1, wherein the at least one semantic prime is detected from a set of sixty-four semantic primes.

8. The computer-implemented method of claim 1, further comprising:
    obtaining the at least one fragment of text from one or more of: a text file, an audio file, an image file, and a video file.

9. A computer program product comprising a computer readable storage medium having program instructions embodied therewith, the program instructions executable by a computing device to cause the computing device to:
    perform a syntactic analysis on at least one fragment of text to derive a syntactic structure of said fragment of text;
    select one or more predefined syntactic structure templates corresponding to said derived syntactic structure, wherein each of the predefined syntactic structure templates define different combinations of semantic primes and semantic features corresponding to said semantic primes for said derived syntactic structure;
    detect semantic information in said fragment of text, wherein the semantic information comprises (i) at least one of the semantic primes and (ii) one or more of the corresponding semantic features, wherein said detection comprises providing said fragment of text as input to at least one trained neural network comprising an attention layer;
    identify one of the selected predefined syntactic structure templates that matches the derived syntactic structure and the detected semantic information in said fragment of text;
    generate a computable meaning representation of said fragment of text based at least in part on said identifying; and
    output said computable meaning representation to one or more natural language understanding applications.

10. The computer program product of claim 9, wherein said syntactic analysis is performed by at least one of: a constituents and a dependency parser.

11. The computer program product of claim 9, wherein the one or more predefined syntactic structure templates are selected from a plurality of predefined syntactic structure templates that are defined by an offline linguistic analysis.

12. The computer program product of claim 9, wherein the at least one trained neural network outputs said semantic information.

13. The computer program product of claim 12, wherein the at least one trained neural network comprises a Bidirectional-Long Short Term Memory (B-LSTM) with attention model.

14. The computer program product of claim 12, wherein the at least one trained neural network is trained to detect each of a plurality of semantic primes across a plurality of domains.

15. The computer program product of claim 9, wherein the at least one semantic prime is detected from a set of sixty-four semantic primes.

16. A system comprising:
    a memory; and
    at least one processor operably coupled to the memory and configured for:
        performing a syntactic analysis on at least one fragment of text to derive a syntactic structure of said fragment of text;
        selecting one or more predefined syntactic structure templates corresponding to said derived syntactic structure, wherein each of the predefined syntactic structure templates define different combinations of semantic primes and semantic features corresponding to said semantic primes for said derived syntactic structure;
        detecting semantic information in said fragment of text, wherein the semantic information comprises (i) at least one of the semantic primes and (ii) one or more of the corresponding semantic features, wherein said detecting comprises providing said fragment of text as input to at least one trained neural network comprising an attention layer;

identifying one of the selected predefined syntactic structure templates that matches the derived syntactic structure and the detected semantic information in said fragment of text;

generating a computable meaning representation of said fragment of text based at least in part on said identifying; and outputting said computable meaning representation to one or more natural language understanding applications.

17. The system of claim 16, wherein said syntactic analysis is performed by at least one of: a constituents and a dependency parser.

18. The system of claim 16, wherein the one or more predefined syntactic structure templates are selected from a plurality of predefined syntactic structure templates that are defined by an offline linguistic analysis.

19. The system of claim 16, wherein the at least one trained neural network, wherein the at least one trained neural network outputs said semantic information.

20. The system of claim 19, wherein the at least one trained neural network comprises a Bidirectional-Long Short Term Memory (B-LSTM) with attention model.

* * * * *